(12) United States Patent
Davis

(10) Patent No.: US 6,615,224 B1
(45) Date of Patent: Sep. 2, 2003

(54) HIGH-PERFORMANCE UNIX FILE UNDELETE

(76) Inventor: Lewis B. Davis, 22106 Clarendon St. #237, Woodland Hills, CA (US) 91367

( * ) Notice: Subject to any disclaimer, the term of this patent is extended or adjusted under 35 U.S.C. 154(b) by 0 days.

(21) Appl. No.: 09/256,627

(22) Filed: Feb. 23, 1999

(51) Int. Cl.[7] ............................................... G06F 17/30
(52) U.S. Cl. ....................... 707/202; 707/200; 707/204; 395/702; 395/703; 395/704
(58) Field of Search .................. 707/200, 204, 707/202; 395/702, 703, 704

(56) References Cited

U.S. PATENT DOCUMENTS

| | | | | |
|---|---|---|---|---|
| 5,265,159 A | * | 11/1993 | Kung .............................. | 380/4 |
| 5,289,540 A | * | 2/1994 | Jones ............................. | 380/4 |
| 5,485,606 A | * | 1/1996 | Midgdey et al. .............. | 707/10 |
| 5,535,375 A | * | 7/1996 | Eshel et al. .................. | 395/500 |
| 5,586,322 A | * | 12/1996 | Beck et al. .................. | 707/200 |
| 5,930,513 A | * | 7/1999 | Taylor ........................ | 395/712 |
| 6,119,212 A | * | 9/2000 | Gross et al. ................ | 711/173 |
| 6,134,660 A | * | 10/2000 | Boneh et al. ............... | 713/193 |
| 6,249,879 B1 | * | 6/2001 | Walker et al. ............... | 714/11 |

OTHER PUBLICATIONS

Tom Pycke, Recovering Files in Linux, available at www.recover.source.net/linux.*

* cited by examiner

*Primary Examiner*—Jean R. Homere

(57) ABSTRACT

A method for deleting files on a UNIX file system, so that they may subsequently be undeleted, without any possibility of loss or damage. A file deleted with the "rm" command, or targeted by the "cp" or "mv" commands, is deleted simply by marking its directory record "deleted", while its inode and data blocks are not freed. The "ls" command is adjusted so as not to display files whose directory records are marked as deleted. A indexed system of deleted-file records of such deleted files is maintained by the UNIX kernel, such that a record for each deleted file contains a pointer to the file's inode, a pointer to the file's directory inode, and the file's deletion time. A deleted file may be undeleted simply by calling an "unrm <file>" command, which uses a kernel system call to undo "deleted" mark in the file's directory record. This procedure restores the file completely, because its inode and data blocks were never freed. The "ls" command again will display the file. The indexed system of deleted-file records, created over time as files are deleted from the UNIX file system, is a necessary tool used by the kernel to efficiently remove the oldest deleted files from the system automatically, without excess system overhead, and without cumbersome system maintenance procedures required from the system administrator.

6 Claims, 6 Drawing Sheets

UNIX FILESYSTEM INODE

|     | 616    | 620  | 624 | 628 |          |
|-----|--------|------|-----|-----|----------|
| 407694, | 0,   | 12,  | 1,  | 0,  | .        |
| 325763, | 12,  | 12,  | 2,  | 0,  | ..       |
| 407692, | 24,  | 16,  | 7,  | 0,  | CHANGES  |
| 407562, | 40,  | 16,  | 5,  | 0,  | acl.o    |
| 407721, | 56,  | 16,  | 5,  | 0,  | acl.c    |
| 407565, | 72,  | 16,  | 8,  | 0,  | balloc.o |
| 407665, | 88,  | 16,  | 6,  | 0,  | file.o   |
| 407569, | 104, | 16,  | 8,  | 0,  | bitmap.o |
| 407664, | 120, | 16,  | 10, | 1,  | undelete.c |
| 407568, | 136, | 16,  | 6,  | 0,  | ext2.o   |
| 407564, | 152, | 20,  | 5,  | 0,  | dir.c    |
| 407566, | 172, | 16,  | 5,  | 0,  | dir.o    |
| 407567, | 188, | 28,  | 7,  | 0,  | inode.c  |
| 407731, | 216, | 16,  | 7,  | 0,  | fsync.c  |
| 407666, | 232, | 20,  | 8,  | 0,  | ialloc.o |
| 407682, | 252, | 16,  | 7,  | 0,  | fsync.o  |
| 407725, | 268, | 20,  | 8,  | 0,  | bitmap.c |
| 407667, | 288, | 20,  | 10, | 0,  | undelete.o |
| 407672, | 308, | 716, | 7,  | 0,  | namei.c  |

**UNIX FILESYSTEM
DIRECTORY BLOCK**

EFQ: End-of-Freelist Queue

HIGH-PERFORMANCE UNIX FILE UNDELETE

BACKGROUND OF THE INVENTION

1. Field of the Invention

This invention relates to the UNIX computer operating system, specifically applying to the "rm" or file delete command, and how to undelete a file removed by the command.

2. Discussion of Related Art

UNIX operating systems have never had a simple file undelete command, one that can undo the operation of the "rm", command**. From the UNIX command-line, if "rm <file>" is entered, then <file> is deleted. At the present time, among all UNIX operating system platforms, there exists no simple command, e.g. "unrm <file>", which can restore the deleted file. There do exist some work-around programs that can be devised or work-around utilities that can be purchased as add-ons. But, all such methods are cumbersome and/or have drawbacks.

Because of the possibility of accidentally removing all of the files in a directory using the "rm *" command and even all of the files and all subdirectories in a directory using the "rm -r *" command, the UNIX operating system has long had an unprotected danger zone among its commands. There is probably no UNIX system administrator who has not made a serious error in file deletion resulting in loss of data that has taken hours if not days to replace, depending on how recently the system was backed up.

In the past, there have been complex and inefficient file undelete utilities and methods on the market for all operating systems including UNIX. They are essentially of the following types: (1) low-level file system scanning utilities, (2) trash directories, and (3) renaming files to hidden types. Some of these methods are described in the comprehensive and in-depth book *UNIX Power Tools*, pp. 399–407, authored by Jerry Peek and published by O'Reilly.

Regarding the first type of file undelete utility, Peter Norton introduced his Norton Unerase Utility for Microsoft's DOS Operating System in 1981. In essence, the latter product performs a complete scan of the file system on the hard disc for intact deleted files. Then it displays a list of them to the user from which to choose for file restoration. At present, there are many such file undelete utilities on the market for various operating systems, including some for UNIX operating systems. These products perform a thorough scan of the file system on the hard disc for intact deleted files, and present a list of them to all the user. However, there are several drawbacks to this type of file undelete utility. First, one must shut down all presently-running tasks on the computer in order to prevent the operating system from overwriting the now-unprotected deleted file's data. Thus, these type of undelete utilities are not fail-safe. A user may not realize he deleted an important file before it is too late, and by then it has been over-written by the operating system. Second, the user must run the undelete utility, which is a time-consuming scan of the complete file system. This operation may take several minutes. Third, in the case of UNIX file systems, such hard disc scans generally cannot provide the name of the deleted file, because the record of the name has been destroyed. Thus, the user can become involved in time-consuming guessing as to which available deleted file is the desired one to restore.

Trash directories have existed for quite some time on Microsoft Windows operating systems. More recently, as UNIX operating systems have added or improved GUI interfaces on their platforms, they too have provided trash directories to protect deleted files, until the user decides to empty the trash directory. This method of protecting files is associated with Windows or Windows-like GUI interfaces to operating systems, and a wastebasket icon is usually displayed for drag-and-drop operations in order to delete files or directories. Files or directories are not really deleted using this method, just moved to the trash directory. Command-line operations, e.g. "C:> del <file>" from the DOS prompt or "$ rm <file>" from the UNIX prompt generally do not move <file> to any trash directory. They destroy the file from the operating system standpoint. In recent years Norton Utilities from Symantec Corporation has provided a low-level "recycle-bin" to protect files removed at the command-line of the Microsoft DOS operating system: "C:> del <file>". The regular DOS "del" command operations are intercepted before they destroy <file>, and instead <file> is moved to a "recycle-bin".

However, to date, such a utility has not been successfully accomplished for UNIX operating systems. The reason for this is that UNIX operating systems are designed to be extremely high-performance. Moving a file to another directory every time the "rm" command is called uses extra system overhead, and can fill up the file system on the hard disc if not properly controlled. A system administrator must continually monitor the storage directory and periodically delete older files or the hard disc may become filled up with stored "deleted" files. Automatic monitoring of a UNIX storage directory would require the creation of a complex background task in order to guard its size. An even more complex background task would be required in order to protect different deleted versions of the same file. UNIX platform providers simply have not provided such programs with their systems, because they would take up too much system overhead.

A file protection method similar to the trash directory was created on the UNIX system at Purdue University as mentioned in the book *UNIX Power Tools* cited above. In this case the "$ rm <file>" command is always intercepted and <file> is copied to a backup machine on the network with very large capacity, before <file> is destroyed on the local machine. This is essentially a "trash directory" for an entire network of UNIX machines. However, the system overhead required in this case is even greater than creating local trash directories on separate machines as previously discussed. This "copy-file/delete-file" trash directory procedure uses many more operations than the simpler "move-file" trash directory procedure described above.

The third general method that has sometimes been used in order to protect "deleted files" on UNIX systems is to alias or substitute the "rm" command with another command that renames a file with a "." prefix. For example, using the command "$ mv foo .foo" instead of "$ rm foo" will protect the file "foo", yet it will not be visible to the "$ ls" command. The file remains in the same directory, but is hidden, because the UNIX "ls" command does not display files with a "." prefix. This procedure is also described in the book *UNIX Power Tools*. However, it has obvious drawbacks. Unless more complexity is used in writing the alias command, so that different suffixes are added to each deleted version of a file with a given name, only one hidden file for each filename can ever exist. Furthermore, if a directory <dir> is "deleted" using this method and a hidden file or directory already exists with the name <.dir>, the UNIX operating system will complain with an error message.

Note**: At the time of this update to the patent application, there has been found on the market a UNIX operating system, SCO Open Server 5.0.6, which has developed an "undelete" command similar to the third method just described. It may be found on the internet:

http://osr5doc.ca.caldera.com:457/OSUserG/_Retrieving_deleted_files.html

It does not alias the "rm" command as mentioned above, but at a lower level, and in a similar manner as described above, seems to intercept the "unlink( )", "truncate( )", and "rename( )" system calls inside the UNIX operating system kernel and create hidden versions of files and directories which are deleted from the command-line using the "rm" command. Essentially, this file undelete method renames files targeted by the "rm" command with special suffixes, so that they are hidden from the "ls" command. Hence, the user does not see them when he lists the files in a directory: "$ ls *". SCO's "undelete" command: "$ undelete <file>" simply renames a hidden version of <file> by removing its special suffix, and so <file> becomes visible to the "ls" command. Multiple versions of the same filename are also protected in the SCO operating system.

The SCO Open Server "undelete" command has similarities to the methods described in the present patent application, since it modifies low-level system calls inside the operating system kernel. Note that this software was produced after the date of my patent application, and years after the date of my initial publication of the "undelete" methods stated herein. However, SCO's "undelete" command still has drawbacks that likely will prevent other UNIX platform providers from implementing similar methods. First, SCO "undelete" actually renames files which are the target of the "rm," command. There is system overhead required to locate a position available in a directory index and create a new entry there in order to rename the file. Second, SCO "undelete" must search the entire set of directory entries every time a file is targeted by the "rm" command in order to decide what suffix, i.e. version number, to apply to a filename in order to rename and hide it. In addition to the extra system overhead just described, the oldest version of a deleted file must also be completely destroyed by performing an absolute removal of the latter's inode and data.

Therefore, it is an object of the present invention to provide a method of file protection on UNIX platforms during file deletion processes, whereby no system performance is sacrificed.

Furthermore, it is an object of this invention to actually enhance UNIX operating system performance, because final destruction of the oldest deleted files is done in large batches.

Finally, it is an object of this invention to automate the cleanup procedures heretofore required by the less efficient trash directory and "hidden file" protection methods, so that cumbersome system administration maintenance and the accompanying system overhead is eliminated.

SUMMARY OF THE INVENTION

The present UNIX file undelete method is implemented through a change in the way the main UNIX core processor, or kernel, manages the file indexing system (inodes), and the general filesystem freelists. According to standard UNIX operating system kernel procedures, when a file is deleted using the "rm" command, three actions occur. First, the filename and pointer are removed from its directory block. Second, the kernel frees up file's data blocks for general use. Third, the kernel frees up the file's indexing record, or inode, for general use. Thus, the file is effectively destroyed from the operating system's standpoint. Only a low-level hard disc scan might piece together the file's information again, if this is done soon enough.

The preferred method for protecting a file from this destructive action is as follows. First, instead of removing the filename and pointer from the directory block upon deletion, simply set a "deleted" flag in the directory block record for the file, but let its record still remain there. The "deleted" flag is used to prevent the "is" command from displaying the file. Second, let the kernel continue to protect the file's inode and data blocks by keeping their freelist bits set. Third, add a record pointing to the file's metadata in a new structure called an EFQ, or end-of-freelist queue.

The EFQ is sequentially-ordered set of short records, each of which contains necessary information about a "deleted", protected file. In order to prevent the UNIX filesystem from becoming over-loaded with hidden protected files, there must be an efficient method to remove the oldest of these protected files. That is where the EFQ comes in. When the total size of all of the files recorded in the EFQ surpasses a certain limit, say 10% of the total filesystem volume, then the operating system kernel will recognize this at the next use of the "rm" command. At that time, it automatically initiates a procedure which starts at the end of the EFQ whose records point to the oldest protected files. This procedure systematically frees up the protected files' records, data blocks, and metadata information for new use by the operating system. It is performed on enough of the oldest records in the EFQ, so that a lower limit, say only 7% of the total filesystem volume, remains under protection with records in the EFQ. Thus, the filesystem never fills up with hidden protected files. Without a high-performance, sequential record structure such as this EFQ, the system maintenance task of permanently removing protected files on a UNIX operating system becomes cumbersome and creates unnecessary system overhead. Note that the 7% and 10% limits mentioned above are examples only, and the system administrator may choose different parameters for the operation of the EFQ.

The following procedure is used to undelete a file protected with this method. First, the addition of a new option to the UNIX "ls" command, allows it to display all of the "deleted" files in a given directory, that is, all entries in the directory with the "deleted" flag set. Second, when the user types "$ unrm <file>" on the command-line, a system call in the UNIX operating system kernel unsets the "deleted" flag in the file's directory record. The "ls" command, using regular options, displays the file again as a normal entry in the directory. Since the file's data blocks and inode were never released, as would be the case using ordinary UNIX delete procedures, the file is now totally restored to the system. The kernel system call used by the "unrm" command also sets a flag in the EFQ's record for that file, indicating that it has been undeleted.

DETAILED DESCRIPTION OF THE PREFERRED EMBODIMENT(S)

Many of the terms used in this description are in common use among those skilled in the use of the UNIX operating system. However, to definitely establish their context for this invention, the following terms are defined.

The UNIX "kernel" is the core operating system program, always maintained in the computer's memory. It performs the all of the low-level operating system functions which control the computer.

A file "pointer" is a numeric value contained in the file's record located in its directory block. This numeric value is the filesystem index number for the file's "inode".

An "inode" is a small data structure containing all of the information about a file. Contained in this data is, for example, (1) the owner of the file, (2) the type of file, (3) permissions as to who may read, write, or execute the file, (4) locations of the file's data blocks on the hard disc. For most present UNIX filesystems, this data structure is generally less than 1 kilobyte (1 KB) long. On the Linux "ext2" filesystem, for example, an inode structure has 128 bytes of data, called "metadata", describing the important file attributes.

"Metadata" is a general programming language term which is applied to data that is used to describe attributes of a structure which contains regular data, or user content.

"Freelists" are bitmap memory structures. Most present UNIX operating systems use bitmaps to determine whether filesystem inodes and data blocks are free to be used or not. If a bit is set to 0, then the associated inode or data block is available for use. If a bit is set to 1, then its associated inode or block is not available for use.

The following terms are related to a specific structure uniquely associated with this invention.

The "EFQ" or "end-of-freelist queue" is a structure comprised of a sequentially-ordered system of smaller "efq entries", which make up the main information contained in the "queue". Each "efq entry" contains important metadata about a deleted file: (1) the time the file was deleted, (2) the index number of the file's inode, (3) the index number of the directory containing the file, and (4) other necessary data particular to the embodiment of the invention. The EFQ structure has a header containing its configuration parameters. The EFQ may be maintained in the computer's RAM memory, it may be maintained as a file on the hard disc, or other media.

Figure 1:
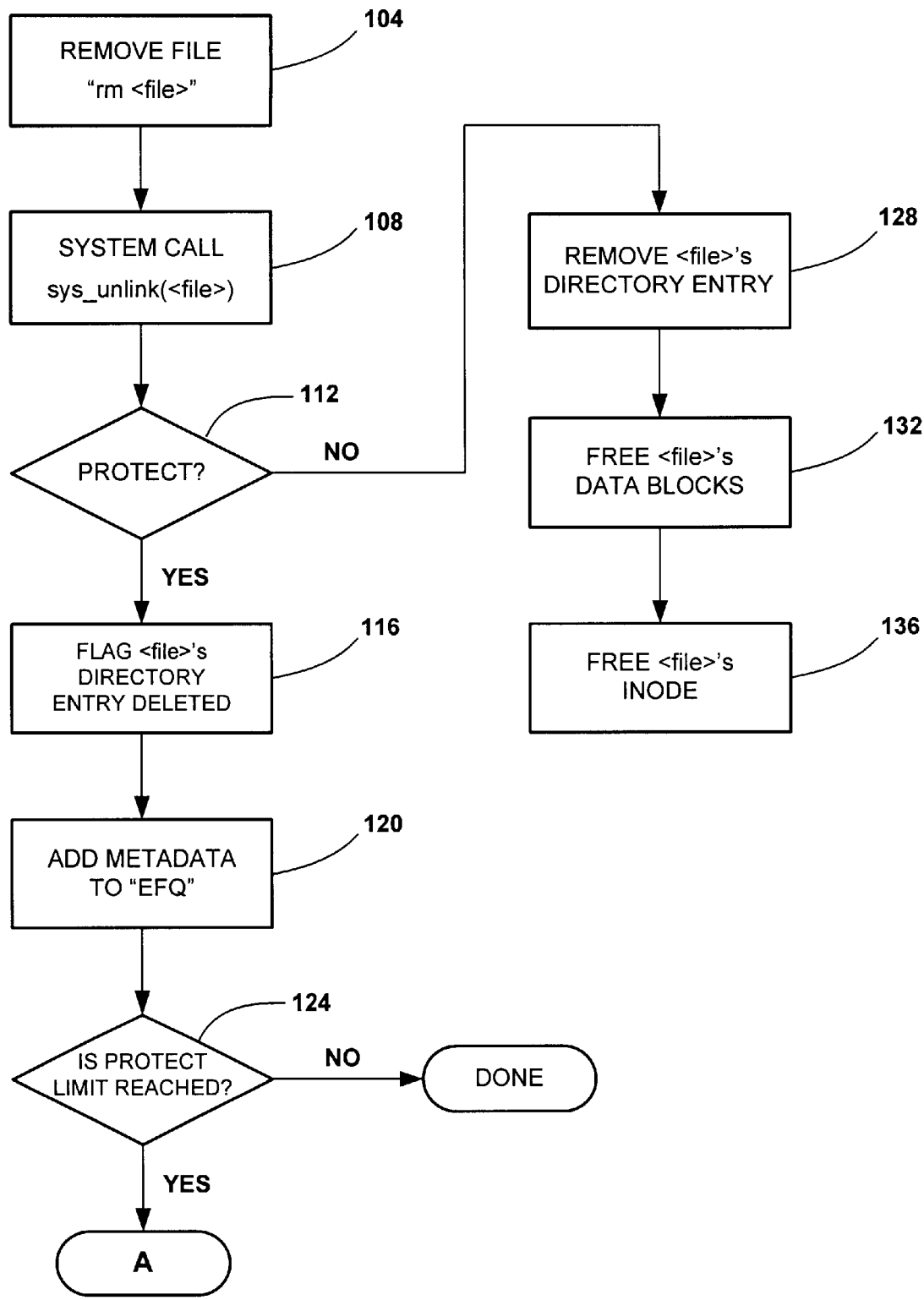
FIG. 1 is a flow chart for the process of file deletion, including the decision of whether to protect or destroy the file.

In a preferred embodiment, FIG. 1 is a flow chart showing the process for deleting a file. The user enters a command to delete a file 104. This may occur in several possible ways: (1) the user may enter "$ rm <file>" from the command line; (2) the user may enter "$ cp <file1> <file2>" from the command line, where <file2> is the name of an existing file; (3) the user may enter "$ mv <file1> <file2>" from the command line, where <file2> is the name of an existing file; (4) the user may run a "C" executable program, which contains an "unlink(<file>)" function call. These are many of the ways in which a file on a UNIX filesystem may be deleted by a user, though not necessarily an exhaustive list.

All of the previously-mentioned higher-level commands and programs that request the UNIX kernel to delete a file use a common lower-level system call, "sys_unlink (<file>)" 108, which is a function the kernel itself performs. Various UNIX operating systems may use different programming names for this function. In this preferred embodiment, "sys_unlink( )" is the name that the Linux operating system uses for this kernel function. At the point 104 when the user requests to delete a file, he may decide whether to protect the file or not. This is done by passing a parameter as an argument to his command. The kernel receives this parameter in the "sys_unlink( )" call 108 and then makes a decision as to which course to follow 112. If the decision is to protect the file, an adjusted "sys_unlink( )" kernel call is directed to set the "deleted" flag in the file's directory record 116, rather than remove the directory record 116 entirely. After this, the adjusted "sys_unlink( )" kernel call sequentially adds the file's "efq entry" to the EFQ 120.

Figure 4:
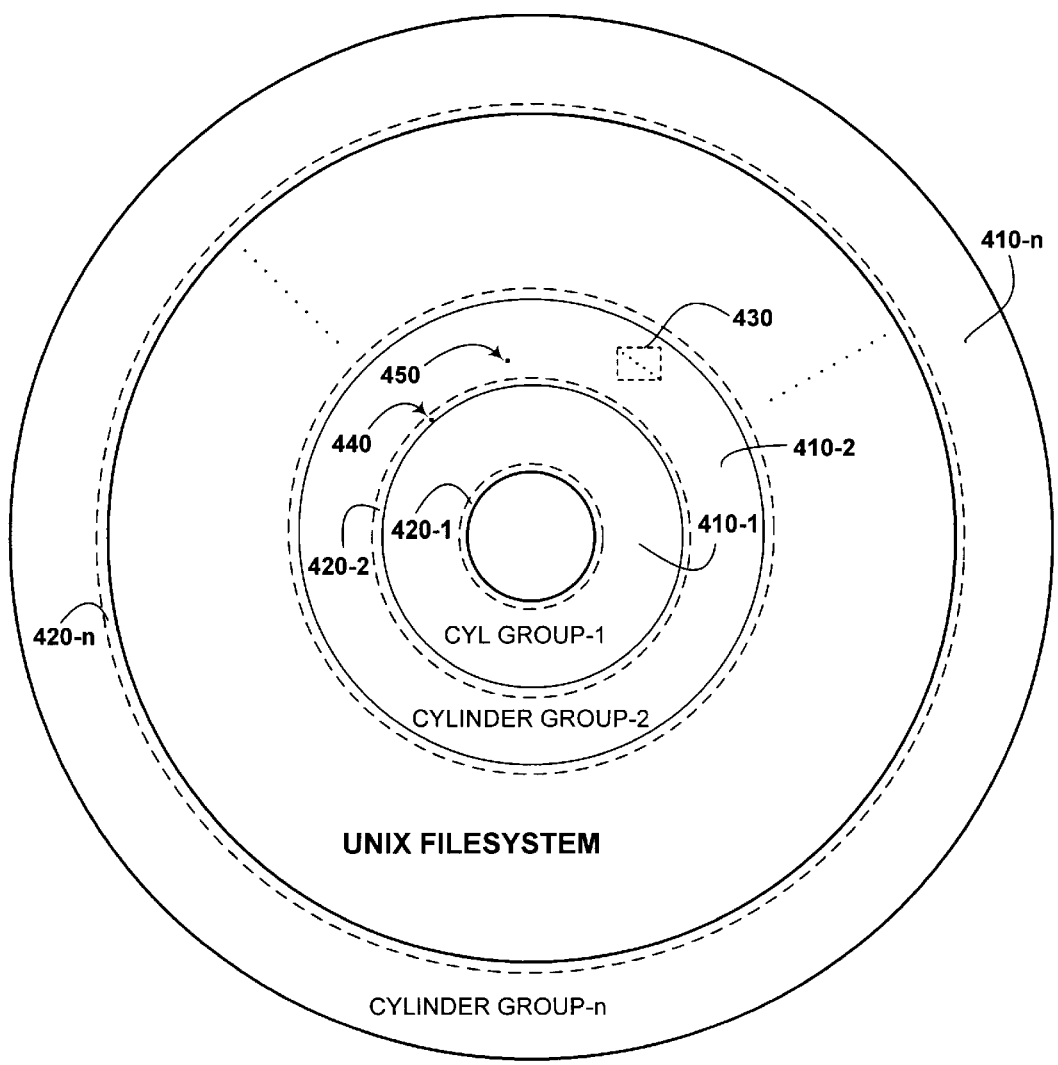
FIG. 4 illustrates a typical UNIX filesystem layout on a hard disc.
Figure 5:
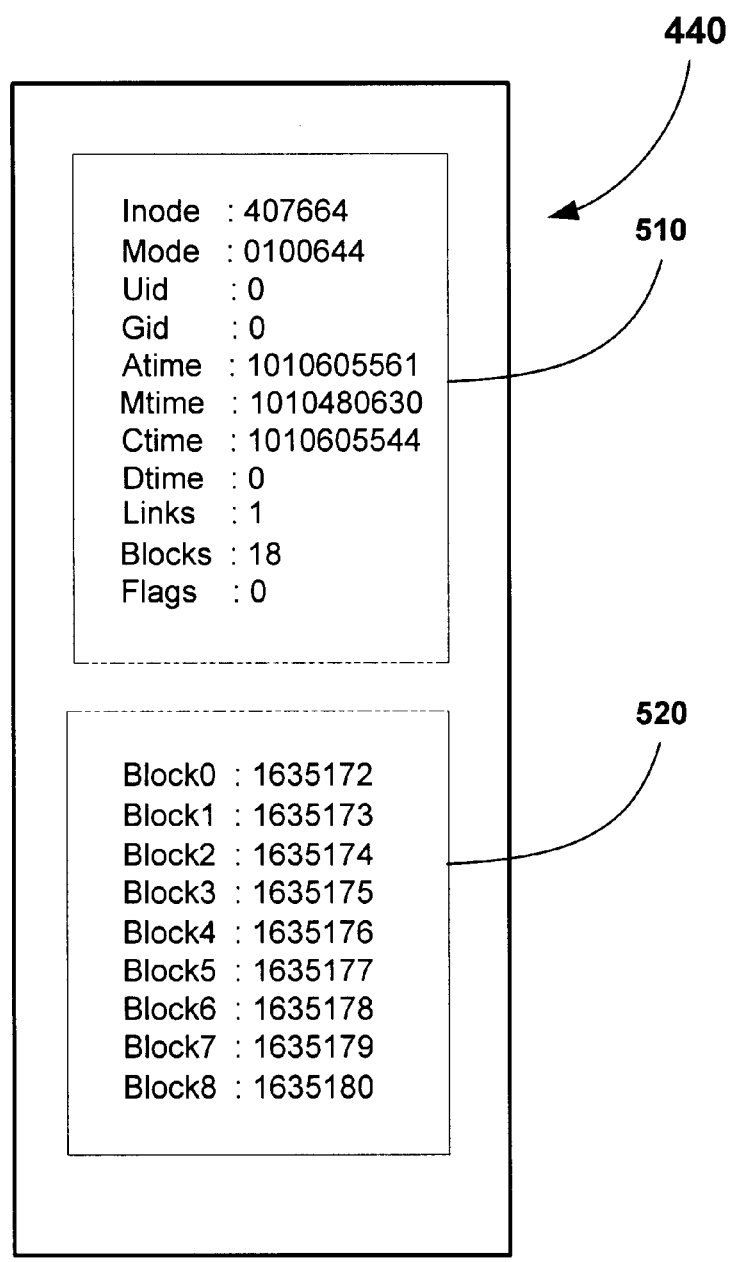
FIG. 5 shows an enlarged diagram of a sample inode containing the metadata for a typical file on a UNIX filesystem.

Procedure 116 of FIG. 1 is described as follows. FIG. 4 illustrates in more detail the objects involved in this operation performed by the kernel. It depicts the layout of a Linux "ext2" filesystem on a hard disc. This filesystem consists of a sequence of cylindrical groups of hard disc blocks 410-1–410-n. The data blocks for a particular file 430 require an inode 440 containing the pointers to these blocks in its metadata. The inode groups 420-1–420-n for this filesystem lie at the beginning of each cylindrical group of hard disc blocks. A specific inode 440 for the particular file 430 is illustrated in FIG. 5. Note the pointers 520 in FIG. 5 to the individual data blocks for the file 430. These pointers are listed along with other metadata 510 contained in the inode 440. The name and inode pointer for the file 430 are listed in a directory block 450.

Figures 6, 7:
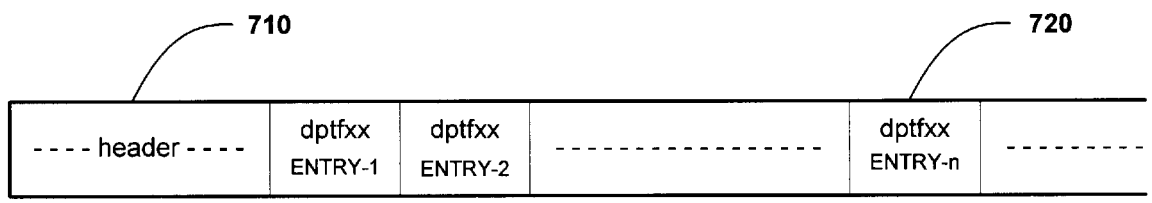
FIG. 6 shows an enlarged diagram of a sample directory block containing records for files in the directory in a UNIX filesystem.
FIG. 7 is a diagram depicting a particular embodiment of an EFQ or end-of-freelist queue.

FIG. 6 illustrates a particular example of the directory block 450 with its records for various files and their inode pointers. The particular file 430 is recorded in its directory block 450 at the location 604 in FIG. 6. The inode pointer 608 in the file record 604 is displayed in the first field 616 of the directory block. This pointer 608, i.e. number 407664, is the same as inode #407664 depicted in FIG. 5. The filename 612 in the file record 604 is displayed in the sixth field 628 of the directory block. Other fields 620 in the directory block contain information about each record, for example the offset, record length, and name length. However, in the preferred embodiment of this invention, a new field 628 is added to each record in the directory block. It is the "deleted" flag, which states whether the file represented by the record is deleted or not. In FIG. 5 a "0" in field 624 signifies that the file is not deleted; a "1" signifies that the file is deleted yet still protected. Note that the file 430 whose name is "undelete.c" in record 604 is deleted, because its flag is set to "1". The preceding has described procedure 116 of the flow diagram in FIG. 1. The UNIX "ls" command has been modified, so that it will not display files whose "deleted" flag is set. However, the file is still protected, because its inode pointer 608 is still contained in the directory record 604, and inode #407664 has not been freed up for other use by the kernel.

Procedure 120 of FIG. 1 is described as follows. FIG. 6 illustrates An "EFQ" structure, which is necessary for the UNIX kernel to perform undelete operations efficiently. In the preferred embodiment, it is maintained in RAM memory for highest possible performance. FIG. 7 shows an EFQ entry 720 that has just been appended to the EFQ, because the file under discussion above has just been deleted. Note that the EFQ is therefore a sequential structure containing a series of entries ordered according to the time that their corresponding file was de-leted. Each entry in the EFQ is a structure made up of a sequence of numbers "dptfxx" related to the deleted file. This data is recorded when the entry is created: d=the inode pointer to the directory in which the file is recorded, p=the inode pointer to the deleted file, t=the time deleted, f=flags for the EFQ entry, x=other data according to various embodiments. Examples of two important flags contained in the number f are described. (1) If the user chooses to undelete the file, then an "undeleted" flag must be set for this EFQ entry, inactivating the entry. (2) If the user chooses to permanently destroy the file, then a "removed" flag must be set for this EFQ entry.

Figure 3:
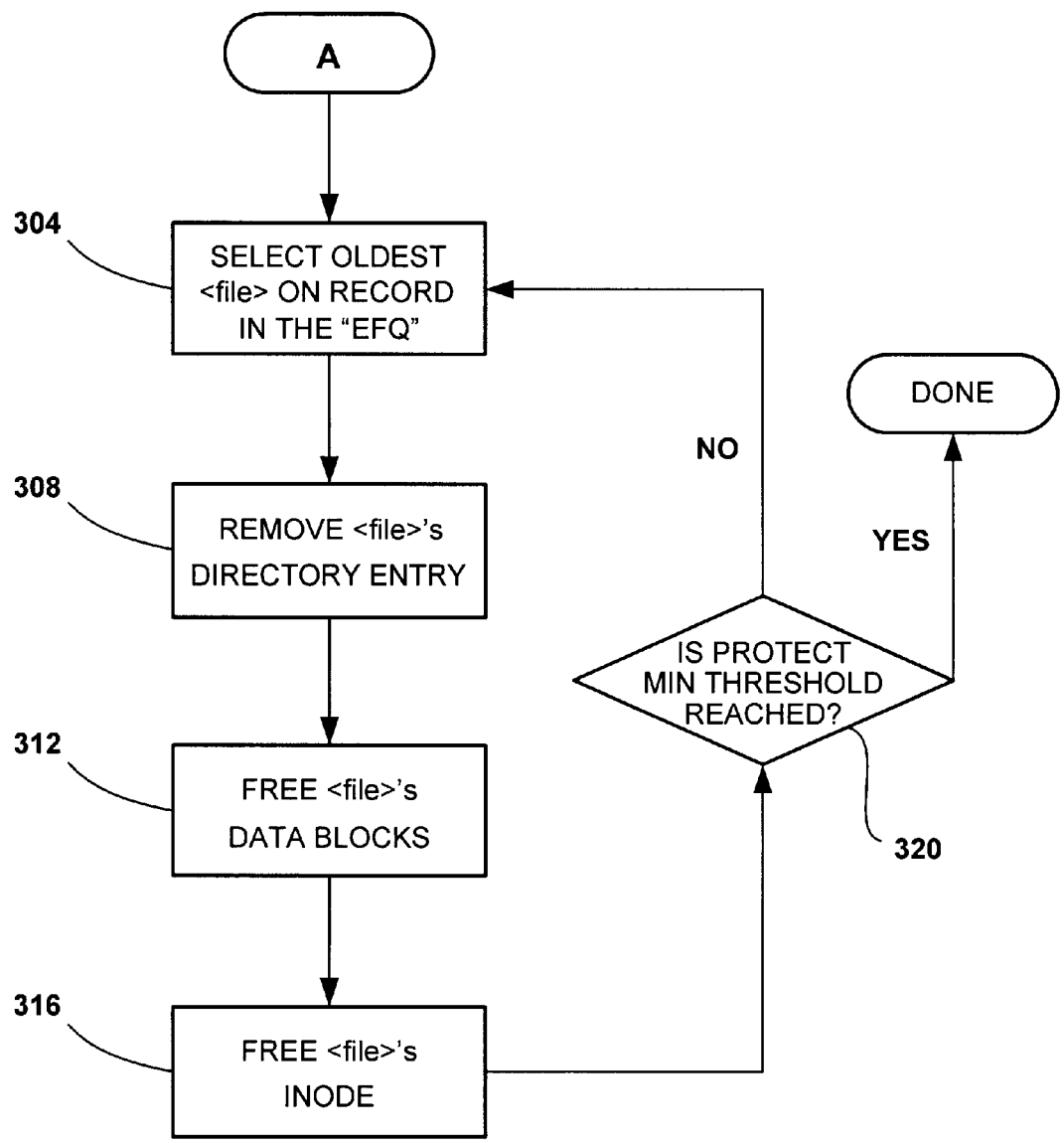
FIG. 3 is a flow chart for the process of permanently removing the oldest files recorded in the EFQ.

After the metadata for the deleted file has been appended as an entry to the EFQ, the total size of the protected files recorded in the EFQ is checked. This running total of the size of the files recorded in the EFQ is stored in a variable in the EFQ's header 710. If the total size is still less than a given maximum (a parameter determined by the UNIX system administrator), then the protected file delete procedure is done. On the other hand, if the total size of the protected files has reached the limit, then the kernel initiates a bulk cleanup procedure. FIG. 3 is a flow chart for the procedure associated with the bulk cleanup. Essentially, the regular UNIX file deletion procedure, which completely destroys files, is applied to the oldest files on record in the EFQ. The file's directory record 308 is removed, the file's data blocks are freed 312, and the file's inode is freed 316. Since the EFQ has been constructed sequentially in order according to each file's deletion time, it is easy to find the files on record in the EFQ sequentially, the oldest being first. Files are repeatedly removed from the system, until the EFQ total protected file size is pared to a reasonable level, this parameter determined by the system administrator. The most recently deleted files, of course, are still protected in the EFQ. Thus, the highly-efficient in-memory EFQ sequential system of records is the key cleaning up excess older protected files, without using excess system overhead.

In FIG. 1, if the decision 112 is made not to protect the file, the kernel proceeds to perform the regular operations that UNIX operating systems have always used for permanently deleting files. At 128 the directory record (see FIG. 5, 504) for the file is permanently removed. At 132 the file's data blocks (see FIG. 1, 330) are immediately freed up for use by the kernel, potentially destroying any data in the blocks very soon. At 136 the file's inode (see FIG. 1, 340) is immediately freed up for use by the kernel, potentially destroying very soon any metadata in the inode which can be used to reconstruct the file.

Figure 2:
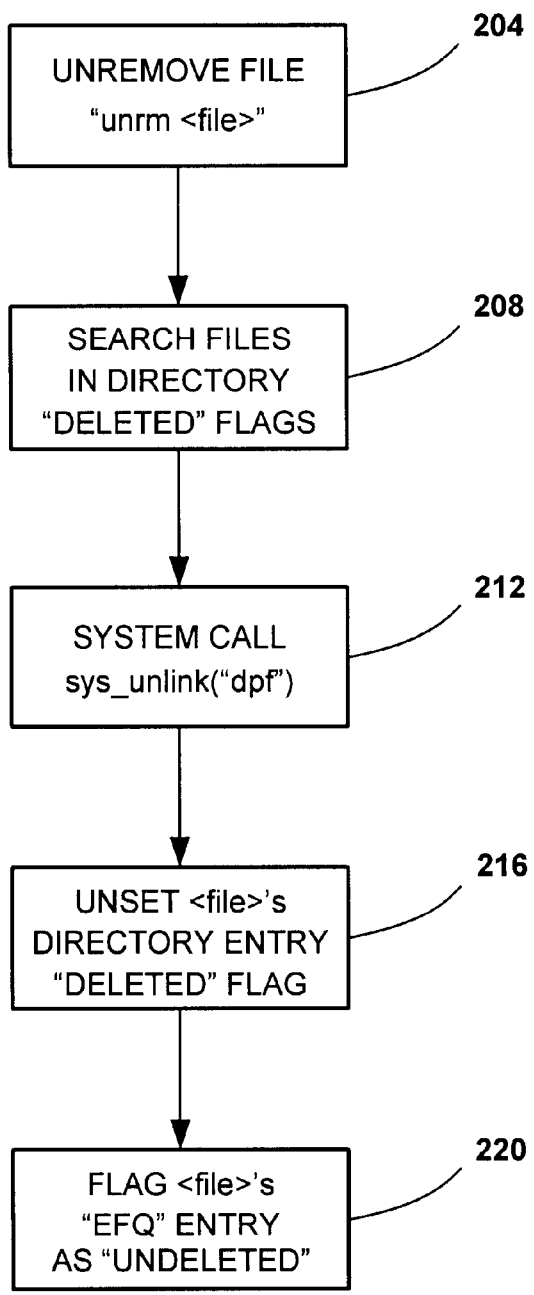
FIG. 2 is a flow chart for the process of undeleting a file.

FIG. 2 is a flow chart showing the operations performed when a file is to be undeleted. This is a reversal of the operations performed when deleting a file in protected mode. The user enters a command to undelete a file 204. This may be performed from the command-line by typing "$ unrm(<file>)". This command searches the directory for all records with the "deleted" flag set 208 (compare FIG. 5, 504, 508). Assume that it finds <file> among the "deleted" records. In the preferred embodiment, a request is sent to the kernel using the "sys_unlink( )" system call. True, a new system call, "sys_undelete( )", may be created also for this purpose. However, a working embodiment has already been written that uses the kernel's "sys_unlink( )" call to perform the undelete operations. The request to the "sys_unlink( )" call sends the kernel the file's directory pointer number, the file's inode pointer number, and an "UNDELETE" flag 212. Using this information, the kernel unsets the "deleted" flag in the file's directory record 216. Finally, the kernel is directed to search the EFQ for the entry which has the file's inode pointer number, and then set the entry's flag as "undeleted". Thus, the UNIX "ls" command will once again display <file> in the directory, and it is completely restored to the system. The EFQ entry for the file has also been inactivated.

In an alternate embodiment for the EFQ, a file on the hard disc may be used instead. This certainly would be less efficient than the straight-on sequence of EFQ entries in RAM, because mechanical hard disc access time and block device processing time is much greater than that for linear byte access in RAM. However, it is still a viable method for creating an EFQ, without being using excessive system overhead.

I claim:

1. A method for deleting a plurality of files on a UNIX filesystem comprising the steps of:

a) setting a flag which marks the directory record for a first file as deleted, such that the "ls" function for the first file recognizes said flag and does not display said first file;

b) storing the inode pointer of said first file, the directory pointer of the directory containing said first file, and the deletion time of said first file in a record on a recording medium which, if it is a volatile recording medium such as RAM memory, may be synchronized to a durable recording medium when the computer system is shut down;

c) repeat steps (a) and (b) for a second file of said plurality of files, appending said record for the second file in a sequential manner to said record for the first file;

d) repeat steps (a) and (b) for subsequent files of said plurality of files, each time appending said record for said subsequent file in a sequential manner to said record for the previous file.

2. The method of claim (1) further comprises a method for restoring a file from said plurality of deleted files comprised of the following steps:

a) unsetting the flag which marked the directory record for said file as deleted, such that the "ls" function no longer reads said flag in the directory record for said file, and thus displays said file;

b) setting a flag which marks said record as undeleted, that is the said record which contains the inode pointer of said file, the directory pointer of the directory containing said file, and the deletion time of said file.

3. The method of claim (1) further comprises a method for completely removing some of the files in said plurality of deleted files comprised of the following steps:

a) choosing the oldest record which is not flagged inactive from among said sequential system of records corresponding to the said plurality of deleted files;

b) using the pointer to the directory and pointer to the inode contained in said record to remove the directory record for the deleted file in the directory which corresponds to said inode pointer;

c) using the pointer to the inode contained in said record to completely remove the data blocks associated with the inode and to completely remove the inode itself from the UNIX file system;

d) flag said record as inactive;

e) repeat steps (a)–(d) for successive oldest records, which are not flagged inactive, in said sequential system of records corresponding to the said plurality of deleted files, until a minimum size threshold for the sequential system of records is met.

4. A method for deleting a plurality of files on a UNIX filesystem comprising the steps of:

a) marking the directory record for a first file as deleted, such that the "ls" function for the first file recognizes said marked directory record and does not display said first file;

b) storing the inode pointer or index of said first file, the inode pointer or index of the directory containing said first file, and the deletion time of said first file in a deleted-file record which is indexed according to said deletion time and stored on a recording medium which, if it is a volatile recording medium such as RAM memory, may be synchronized to a durable recording medium when the computer system is shut down;

c) repeat steps (a) and (b) for all subsequent files of said plurality of files.

5. The method of claim (4) further comprises a method for restoring a file from said plurality of deleted files comprised of the following steps:

a) removing the mark on the directory record for said file, such that the "ls" function no longer recognizes said mark for said directory record for said file, and thus displays said file;

b) using a means to mark said file's deleted-file record as undeleted, that is the said record which contains the inode pointer of said file, the directory pointer of the directory containing said file, and the deletion time of said file.

6. The method of claim (4) further comprises a method for completely removing some of the files in said plurality of deleted files comprised of the following steps:

a) using the deleted-file index to choose the oldest deleted-file record which is not marked undeleted or unactive from among said indexed system of deleted-file records corresponding to the said plurality of deleted files;

b) using the pointer to or index of the inode of said file's directory and pointer to or index of the inode of said file contained in said deleted-file record to remove from the director the directory record for said deleted file;

c) using the pointer to or index of the inode of said file contained in said deleted-file record to completely remove the data blocks associated with said file and to completely remove the inode itself from the UNIX file system;

d) using a means to mark said deleted-file record of said file as inactive;

e) repeat steps (a)–(d) for successive oldest records, which are not marked undeleted or inactive, in said indexed system of deleted-file records corresponding to the said plurality of deleted files, until a pre-determined-determined threshold size for the system of deleted-file records is met.

\* \* \* \* \*